Sept. 20, 1966     A. O. SYKES     3,274,539
TRANSDUCER FOR SIMULTANEOUS MEASUREMENT
OF PHYSICAL PHENOMENA OF SOUND WAVE
Filed Nov. 30, 1964

INVENTOR.
ALAN O. SYKES ns of the sonic waves. However, the prior art devices

United States Patent Office 3,274,539
Patented Sept. 20, 1966

3,274,539
TRANSDUCER FOR SIMULTANEOUS MEASUREMENT OF PHYSICAL PHENOMENA OF SOUND WAVE
Alan O. Sykes, 304 Mashie Drive, Vienna, Va.
Filed Nov. 30, 1964, Ser. No. 414,929
10 Claims. (Cl. 340—10)

The invention described herein may be manufactured and used by or for the Government of the United States of America for governmental purposes without the payment of any royalties thereon or therefor.

The present invention relates to transducers and more particularly to a transducer capable of simultaneously detecting a plurality of physical phenomena at the same point in space.

Generally, the prior art transducers detect a single physical phenomena associated with a sonic wave in a fluid medium. The prior art devices are usually responsive to the amplitude of a sonic wave moving in a fluid medium. Therefore, the prior art transducers are utilized for measuring the amplitude or the time of variation of the sonic waves. However, the prior art devices are incapable of simultaneously measuring the amplitude of a sonic wave at a given point and the acceleration of the transducer produced thereby.

The present invention eliminates the limitations of the prior art by providing a first pair of sensors for detecting the pressure of a sonic wave at a given point in space and a second pair of sensors for detecting the acceleration of the transducer produced by a sonic wave at the same point in space. The first and second pairs of sensors are electrically isolated from each other.

An object of the present invention is to provide a transducer for simultaneously measuring a plurality of physical parameters associated with a sonic wave at a given point in space in a fluid medium.

Another object of the invention is to provide a transducer for the simultaneous measurement of a plurality of physical parameters without having the measurement of one parameter interfere with the measurement of the other parameter.

A further object of the invention is to a ruggedly constructed transducer for simultaneously measuring a plurality of physical parameters associated with a sonic wave.

Figure 1:
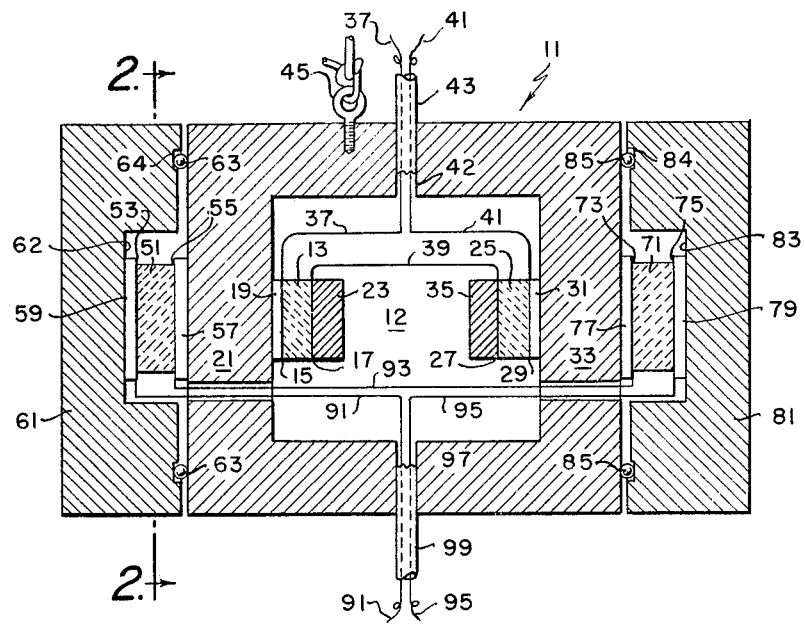
Figure 2:
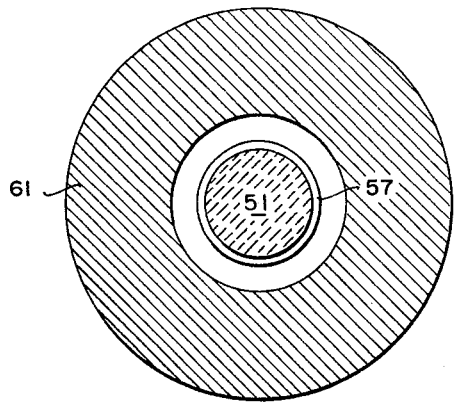

Other objects and many of the attendant advantages of this invention will be readily appreciated as the same becomes better understood by reference to the following detailed description when considered in connection with the accompanying drawings wherein:

FIG. 1 is a cross sectional view of a preferred embodiment of the invention; and FIG. 2 is a section of the device taken on line 2—2 of FIG. 1 looking in the direction of the arrows.

Referring to FIG. 1, a housing 11, made of metallic, plastic or other suitable material, contains a cavity 12 housing a first piezoelectric crystal 13. The piezoelectric crystal 13 contains a first electrode 15 attached to one surface and a second electrode 17 attached to the other surface. An insulating washer 19 is fixedly attached (for example by cement or a non-illustrated bolt), to the wall 21 of the housing 11. The piezoelectric crystal 13 is fixedly attached to the insulating washer 19. A mass 23 is fixedly attached to the piezoelectric crystal 13. A second piezoelectric crystal 25 is provided with a first electrode 27 and a second electrode 29. An insulating washer 31 is fixedly attached to the wall 33 of the housing 11. The piezoelectric crystal 25 is fixedly attached to the insulating washer 31. A mass 35 is fixedly attached to the piezoelectric crystal 25. The piezoelectric crystals 13 and 25 and their respective masses 23 and 25 form a piezoelectric accelerometer. However, the accelerometer may be replaced by a velocity sensor or a magnetostrictive type sensor, if desired.

A first lead 37 is connected to the electrode 15. A lead 39 connects electrode 17 on piezoelectric crystal 13 to electrode 27 of piezoelectric crystal 25. Lead 41 is connected to electrode 27. A hole 42 is provided to permit the leads to pass through the housing 11. The leads are protected by a water proof casing 43 which is fitted to the housing in a watertight fashion in the hole 42. An eye hook 45 is screwed into the housing 11 for suspending the housing 11 in fluid medium. The eye hook 45 is axially located to prevent tilting of the housing. However, if desired, a plurality of non-illustrated eye hooks may be provided for enabling remote orientation in any desired direction. The housing 11 is supported by resilient means to enable free lateral movement in the fluid in response to sonic waves.

A third piezoelectric crystal 51 is provided with a first electrode 53 and a second electrode 55. An insulating washer 57 is fixedly attached to the wall 21. The piezoelectric crystal 51 is fixedly attached to the insulating washer 57. An insulating washer 59 is fixedly attached to the other side of the piezoelectric crystal 51. A cover 61 is fixedly attached to the housing 11 by way of non-illustrated bolts. These bolts have a relatively low stiffness compared to the piezoelectric crystal. An O ring 63 is mounted in a groove 64 to assure a watertight seal between the cover 61 and the housing 11. Preferably the O ring 63 is made of a material having low stiffness compared with the sensing device utilized. The cover 61, the piezoelectric crystal 51 and the insulating washers 57 and 59 have their dimensions proportioned so that the insulating washer 59 is in contact with the inside surface 62 of the cover 61 when the cover 61 is fastened to the housing 11 in a watertight fashion.

A fourth piezoelectric crystal 71 is provided with a first electrode 73 and a second electrode 75. An insulating washer 77 is fixedly attached to the housing 11. The piezoelectric crystal 71 is fixedly attached to the insulating washer 77. An insulating washer 79 is fixedly attached to the crystal 75. A cover 81 is fixedly attached to the housing by way of non-illustrated bolts. These bolts have a relatively low stiffness compared to the piezoelectric crystal. An O ring 85 similar to O ring 63 is mounted in a groove 84 for assuring a watertight seal between the cover 81 and the housing 11. The cover 81, the piezoelectric crystal 71, and the insulating washers 77 and 79 have their dimensions proportioned so that the insulating washer 79 is in contact with the inside surface 83 of the cover 81 when the cover 81 is fastened to the housing 11 in a watertight fashion. All of the insulating washers utilized in the present disclosure are made out of glass, quartz or the like material.

A lead 91 is connected to the electrode 53 of piezoelectric crystal 51. A second lead 93 has one end connected to electrode 55 of piezoelectric crystal 51 and the other end of lead 93 is connected to electrode 73 of piezoelectric crystal 71. A lead 91 is connected to the other electrode 75 of piezoelectric crystal 71. A hole 97 is provided with a water proof cable 99 for carrying leads 91 and 95 to the remotely located electronic equipment. The water proof cable 91 is sealed in hole 97 in a watertight fashion to the housing 11.

The embodiment illustrated in FIG. 1 as described, utilizes O rings 63 and 85 for the sealing members. However, other sealing means such as rubber or plastic washers, may be utilized. Additionally the entire device may be potted in suitable plastic or elastomeric materials for providing fluidtight integrity while simultaneous protecting the device from corrosion.

The operation of the transducer of FIG. 1 is as follows: The transducer is attached to a flexible supporting means and lowered to the desired depth in a fluid medium. The device is then oriented in the direction of the sonic disturbance. A generated sonic wave having a wave length greater than the length of the transducer (at least 5 times as long) travels through the fluid medium striking one of the covers. The sonic wave causes the transducer to move a slight distance through the fluid medium. The piezoelectric crystals 51 and 71 are compressed causing them to generate an electric signal which is proportional to the sound pressure generated by the sonic wave. It is noted that there is a slight phase delay between the signals generated by piezoelectric crystals 51 and 71. This phase delay is proportional to the fraction of the wave length traveled by the sonic wave between the two sensors. However this phase delay causes an extremely small difference in the instantaneous signal generated by the pressure sensing piezoelectric crystals 51 and 71 and therefore this small instantaneous signal difference can be disregarded. The piezoelectric crystals 13 and 25 sense the acceleration of the transducer caused by the sonic wave as it travels through the sonic medium.

Obviously many modifications and variations of the present invention are possible in the light of the above teachings. It is therefore to be understood that within the scope of the appended claims the invention may be practiced otherwise than as specifically described.

What is claimed is:

1. A transducer for simultaneously measuring a plurality of characteristics of a sonic wave at the same point in space comprising:
    a first means for sensing a first physical characteristic of a sonic wave at a given point in space;
    a hollow housing, said first means for sensing a physical characteristic of a sonic wave on a given point in space mounted within said hollow housing; and
    a second means for sensing a second physical characteristic of a sonic wave at a given point in space rigidly mounted on the outside of said hollow housing.

2. A transducer for simultaneously measuring a plurality of characteristics of a sonic wave at the same point in space comprising:
    a first piezoelectric crystal sensing means;
    a fluid tight hollow housing, said first piezoelectric crystal being mounted within said fluid tight hollow housing;
    a second piezoelectric crystal sensing means, said second piezoelectric crystal being rigidly mounted on the outside of said housing;
    means inclosing said second piezoelectric crystal in a fluid tight fashion.

3. A transducer for simultaneously measuring a plurality of characteristics of a sonic wave at the same point in space comprising:
    a first and second piezoelectric crystal;
    a fluid tight hollow housing, said first and second piezoelectric crystal mounted within said fluid tight hollow housing; and
    a third and fourth piezoelectric crystal, said third and fourth piezoelectric crystal being mounted on the outside of said housing.

4. A transducer for simultaneously measuring a plurality of characteristics of a sonic wave at the same point in space as defined in claim 3, but further characterized by having said first and second piezoelectric crystal electrically connected in series.

5. A transducer for simultaneously measuring a plurality of characteristics of a sonic wave at the same point in space as defined in claim 4, but further characterized by having said third and fourth piezoelectric crystal electrically connected in series.

6. A transducer for simultaneously measuring a plurality of characteristics of a sonic wave at the same point in space as defined in claim 5, but further characterized by having said fluid tight housing provided with a means for attaching a resilient supporting means to said housing; and
    a resilient supporting means attached to said last named means.

7. A transducer for simultaneously measuring a plurality of characteristics of a sonic wave at the same point in space as defined in claim 3, but further characterized by having said fluid tight housing provided with a means for attaching a resilient supporting means to said housing; and
    a resilient supporting means attached to said last named means.

8. A transducer for simultaneously measuring a plurality of characteristics of a sonic wave at the same point in space as defined in claim 2, but further characterized by having said fluid tight housing provided with a means for attaching a resilient supporting means to said housing; and
    a resilient supporting means attached to said last named means.

9. A transducer for simultaneously measuring a plurality of characteristics of a sonic wave at the same point in space as defined in claim 1, but further characterized by having said fluid tight housing provided with a means for attaching a resilient supporting means to said housing; and
    a resilient supporting means attached to said last named means.

10. A transducer for simultaneously measuring a pair of characteristics associated with a sonic wave at the same point in space comprising:
    a first and second piezoelectric crystal;
    a fluid tight hollow housing;
    means connected to said housing for resiliently mounting said housing and orienting said housing in space;
    said first and second piezoelectric crystal mounted within said fluid tight hollow housing, said first and second piezoelectric crystal being electrically connected in series;
    a third piezoelectric crystal, said third piezoelectric crystal being mounted on the outside of said housing;
    means enclosing said third piezoelectric crystal in a fluid tight fashion;
    a fourth piezoelectric crystal, said fourth piezoelectric crystal being mounted on the outside of said housing;
    means enclosing said fourth piezoelectric crystal in a fluid tight fashion;
    a first fluid tight cable means carrying a pair of conductors connected to said fluid tight housing in a fluid tight manner, one of said conductors being connected to said first piezoelectric crystal and the other conductor being connected to said second piezoelectric crystal; and
    a second fluid tight cable means carrying a pair of conductors, one of said conductors being connected to said third piezoelectric crystal and the other conductor being connected to said fourth piezoelectric crystal.

References Cited by the Examiner

UNITED STATES PATENTS

| | | | |
|---|---|---|---|
| 2,210,045 | 10/1938 | Schneider | 310—9 |
| 3,027,540 | 3/1962 | Howatt | 340—10 |
| 3,104,334 | 9/1963 | Bradley | 310—8.4 |
| 3,113,288 | 12/1963 | Snavely | 340—10 |
| 3,158,831 | 11/1964 | Boyer | 340—5 |

References Cited by the Applicant

UNITED STATES PATENTS

| | | |
|---|---|---|
| 3,110,825 | 11/1963 | Miller. |

CHESTER L. JUSTUS, *Primary Examiner.*

G. M. FISHER, *Assistant Examiner.*